(12) United States Patent
Martinis

(10) Patent No.: US 7,503,566 B2
(45) Date of Patent: Mar. 17, 2009

(54) WORKPIECE-GRIPPING DEVICE FOR TOOL MACHINES

(75) Inventor: Marco Martinis, Turin (IT)

(73) Assignee: Vigel S.p.A., Borgaro Torinese (IT)

( * ) Notice: Subject to any disclaimer, the term of this patent is extended or adjusted under 35 U.S.C. 154(b) by 383 days.

(21) Appl. No.: 11/271,869

(22) Filed: Nov. 14, 2005

(65) Prior Publication Data

US 2007/0014648 A1    Jan. 18, 2007

(30) Foreign Application Priority Data

Jul. 12, 2005    (EP)  ................................. 05425503

(51) Int. Cl.
    *B23B 31/18* (2006.01)

(52) U.S. Cl. .................. 279/137; 279/143; 269/74; 269/225; 483/31

(58) Field of Classification Search ............. 279/132, 279/137, 142–144, 158, 901; 269/74, 77, 269/79, 99, 100, 216, 225, 229, 235; 82/142, 82/146, 153, 162; 408/103; 409/144; 483/19, 483/20, 31, 900, 901; 901/31, 38; *B23B 31/18*
See application file for complete search history.

(56) References Cited

U.S. PATENT DOCUMENTS

| | | | |
|---|---|---|---|
| 4,113,115 A | * | 9/1978 | Yoshio ..................... 414/591 |
| 4,579,380 A | * | 4/1986 | Zaremsky et al. ........ 294/119.1 |
| 4,716,647 A | | 1/1988 | Winkler et al. |
| 5,584,161 A | * | 12/1996 | Zanini et al. ................. 53/317 |
| 5,803,886 A | | 9/1998 | Schweizer et al. |

FOREIGN PATENT DOCUMENTS

| FR | 2 848 888 A | | 6/2004 |
|---|---|---|---|
| JP | 60076929 A | * | 5/1985 |

* cited by examiner

*Primary Examiner*—David P Bryant
*Assistant Examiner*—Eric A Gates
(74) *Attorney, Agent, or Firm*—Modiano & Associati; Albert Josif; Daniel J. O'Byrne

(57) ABSTRACT

A workpiece-gripping device for tool machines having a motorized chuck mounted on an operating head comprises a housing, a driving shaft journaled in the housing and provided with a shank engageable in the chuck, a locking member configured to engage a reaction member integral with the operating head when the shank engages the chuck, whereby the rotation of the device is prevented when the chuck is driven, and at least a pincer having jaws, of which at least one is movable and operatively connected via transmission means to said driving shaft for opening and closing.

9 Claims, 4 Drawing Sheets

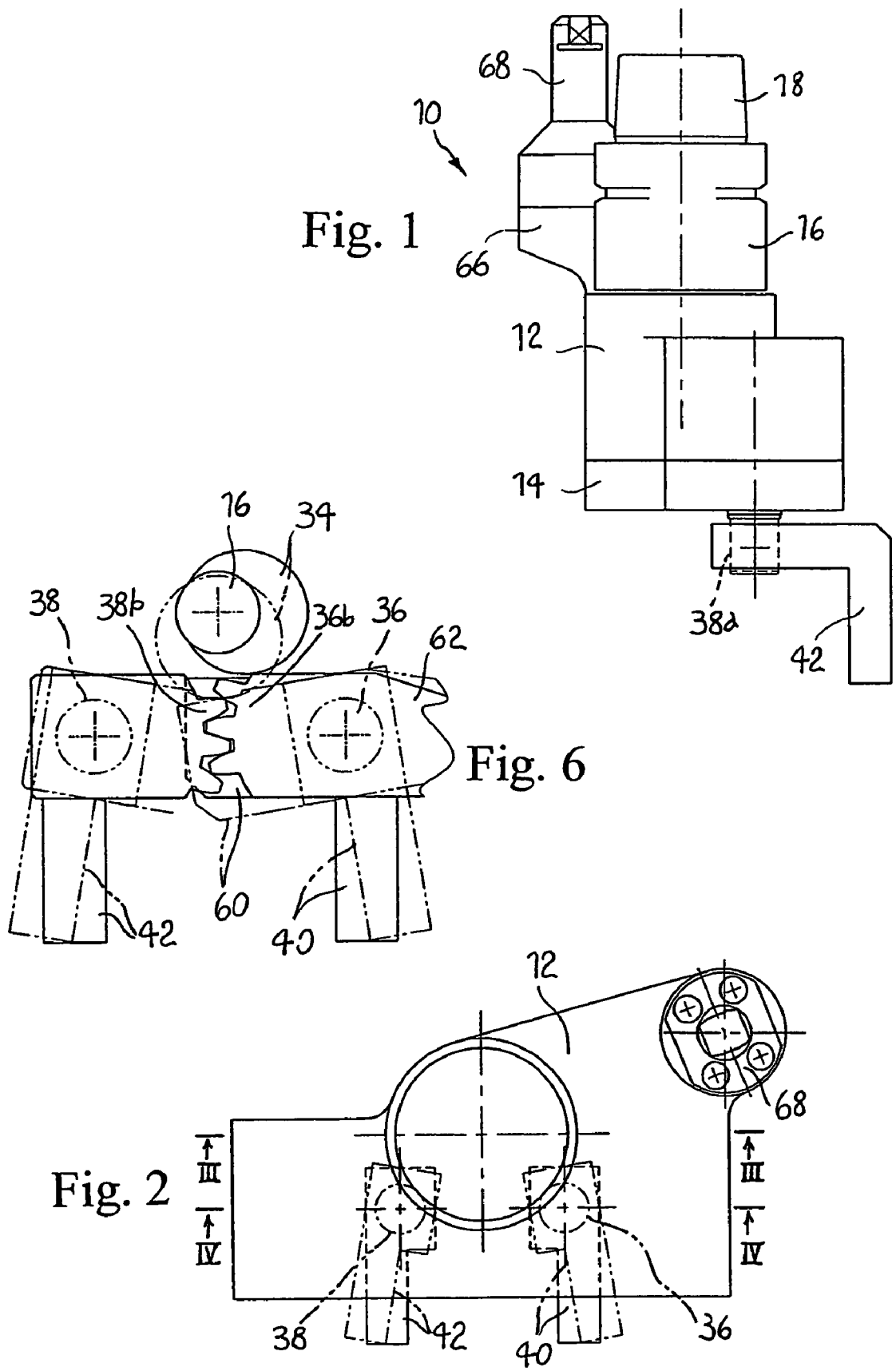

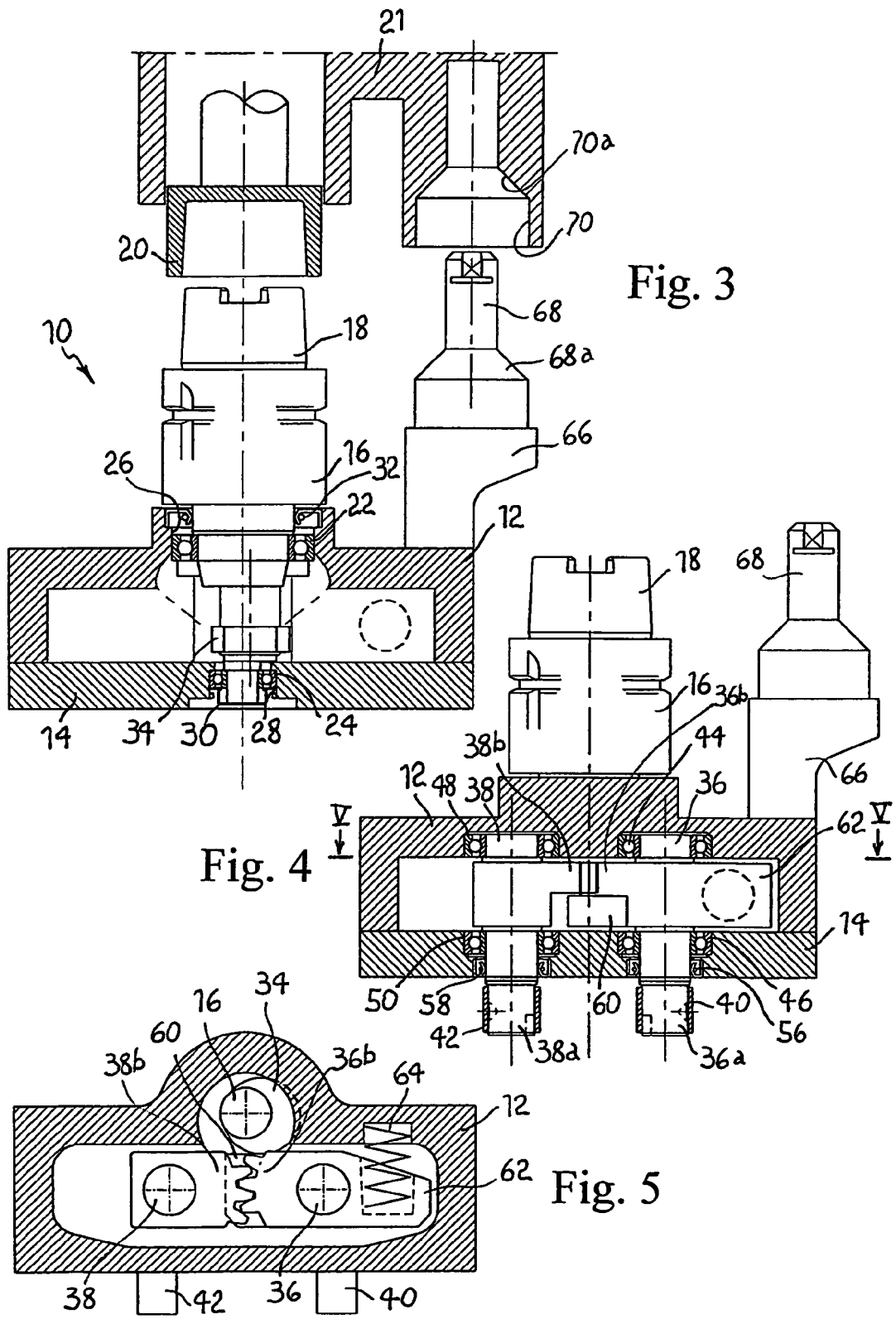

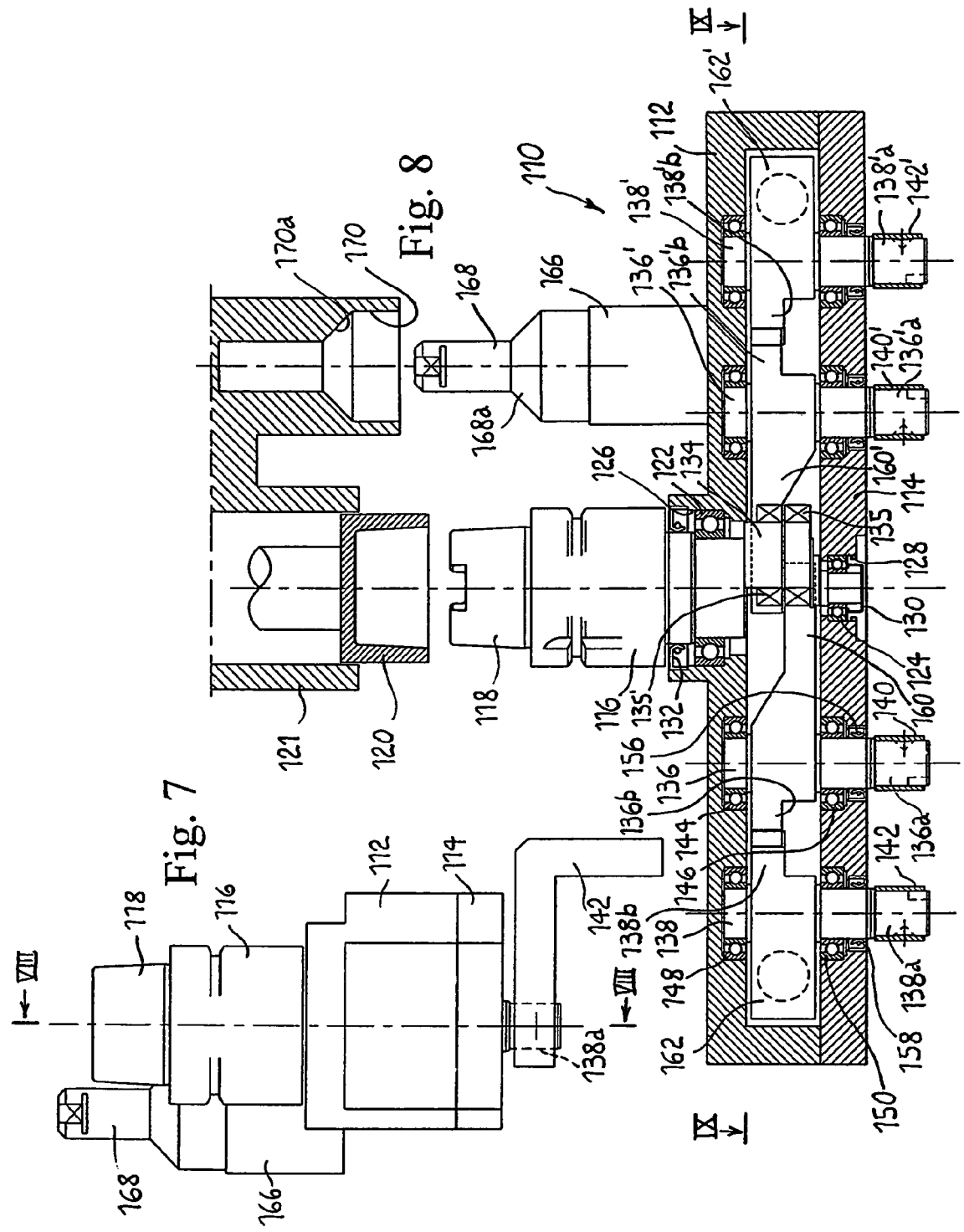

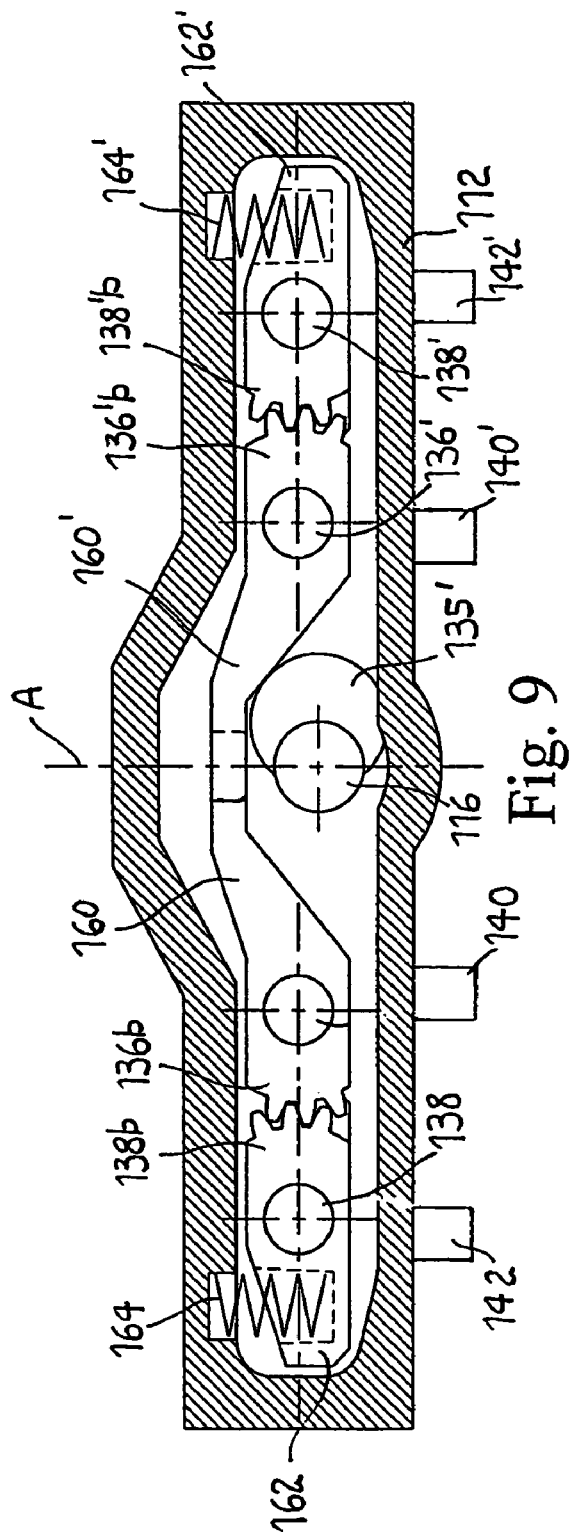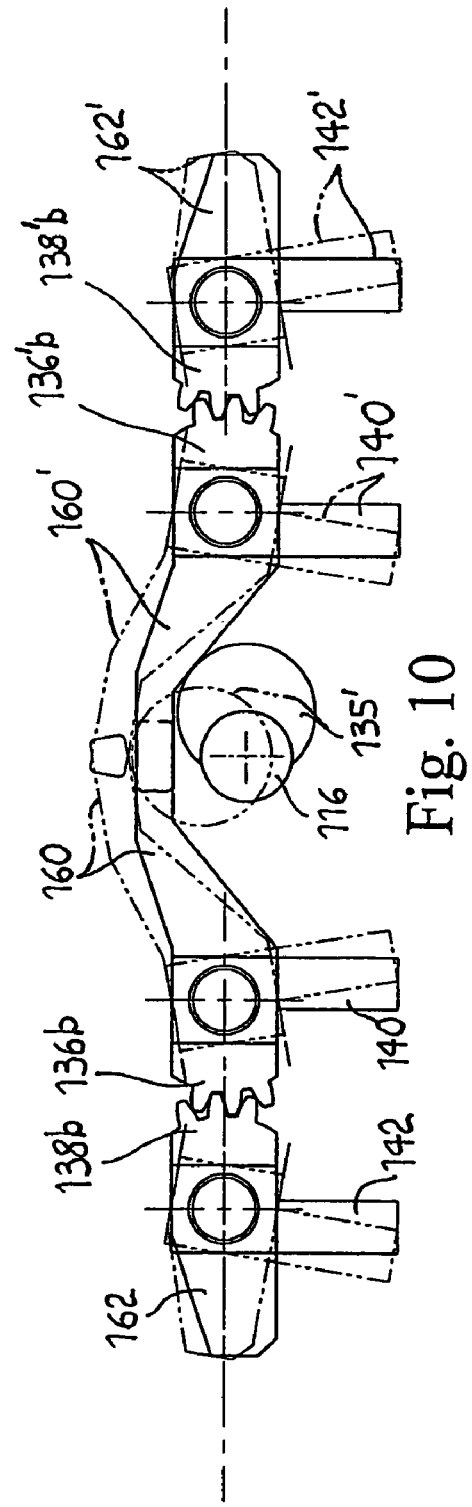

WORKPIECE-GRIPPING DEVICE FOR TOOL MACHINES

BACKGROUND OF THE INVENTION

This invention is concerned with a workpiece-gripping device for tool machines. As well known, mechanical parts are generally manufactured starting from a steel or aluminum blank on which a tool machine having an operating head movable along one or more directions performs a number of machining operations such as boring, facing, drilling, tapping, and the like. Highly automated tool machines can automatically pick up a required tool from a tool magazine located beside the operating head of the machine. Loading and unloading of the workpiece to and from the worktable can be performed manually or, for a a higher productivity, by automated loading/unloading devices, such as disclosed in U.S. Pat. No. 4,716,647. There, the operating head picks the workpiece by means of a gripping device that is automatically mounted on the chuck, similarly to a regular tool. The head places the workpiece on the worktable, and the gripping device is then returned to the tool magazine, while a tool is mounted on the chuck. After the machining schedule is completed, the tool is returned to the tool magazine and the gripping device is again picked up, so that the operating head can remove the newly machined workpiece from the worktable and pick up a fresh one.

Known gripping devices such as disclosed in the above prior document are provided with pincers controlled by hydraulic cylinders driven by an external hydraulic circuit. However, there are drawbacks in hydraulically controlled pincers, notably that a supply circuit for high-pressure fluid has to be provided, with attendant increase of the costs of manufacturing, operating and maintaining the tool machine. Moreover, the very existence of the hydraulic circuit involves unavoidable long-term leakages due to wear of the controlling members, as well as leakages in the fluid-supply line. This circumstance leads to pollution of the working area and to possible malfunction.

Further, due to the intrinsic nature of hydraulic control systems, the delay from the control command and the completion of the actual mechanical event is never known accurately. Such a delay may vary considerably among different actions, and may change in the course of time due to line leakages, cylinder wear, and the like. Consequently, before displacing the head it is necessary to allow a certain time delay that is longer than the average foreseeable reaction time, with attendant lengthening of the work schedule.

SUMMARY OF THE INVENTION

Accordingly, it is the main object of the invention to provide a workpiece-gripping device for tool machines which can overcome the drawbacks of known hydraulically controlled devices as mentioned above. More particularly, the gripping device of the invention should be suitable for use on conventional tool machines having a motorized chuck without requiring additional power sources, and should guarantee accurate and repeatable reaction times, thereby allowing the working schedule to be optimized.

The above and other objects and advantages, such as will better appear below, are attained by a gripping device having the features recited in claim 1, while the dependent claims define other adavantageous though accessory features of the invention.

BRIEF DESCRIPTION OF THE DRAWINGS

The invention is described below with reference to a few preferred but non-esclusive embodiments, shown by way of non-limiting examples in the attached drawings, wherein:

FIG. 1 is a view in side elevation of a workpiece-gripping device according to the invention, FIG. 2 is a plan view of the device of FIG. 1, FIG. 3 is a cross-sectional view taken along line III-III of the device of FIG. 2, in association with an operating head of a conventional tool machine, FIG. 4 is a view in cross-sectrion made along line IV-IV of the device of FIG. 2, FIG. 5 is a view in cross-sectrion made along line V-V of the device of FIG. 4, FIG. 6 is a schematic plan view of the operating mechanism of the device of FIG. 1, FIG. 7 is a view in side elevation of a workpiece-gripping device according to an alternative embodiment of the invention, FIG. 8 is a cross-sectional view taken along line VIII-VIII of the device of FIG. 7, in association with an operating head of a conventional tool machine, FIG. 9 is a a cross-sectional view taken along line IX-IX of the device of FIG. 8, FIG. 10 is a schematic plan view of the operating mechanism of the device of FIG. 7.

DESCRIPTION OF THE PREFERRED EMBODIMENTS

With reference to FIGS. 1 to 6, a workpiece-gripping device 10 is to be used in association with a conventional tool machine (not shown) having an operating head movable along one or more directions and capable of performing different machining operations on workpieces, such as boring, facing, drilling, tapping, and the like, while picking up machining tools as required from a tool magazine located beside the machine's operating head.

Device 10 comprises, according to the invention, a box-like housing 12, whose bottom is closed by a cover 14. A driving shaft 16 is journaled within housing 12 and is terminated, outside the housing, in a shank 18 that is axially engageable in a motorized chuck 20 carried on operating head 21 of the tool machine.

Driving shaft 16 is journaled on rolling bearings 22, 24 which are respectively housed in a cylindrical socket 26 of housing 12 and in a bore 28 in cover 14, the bore being sealed by a sealing cap 30. A sealing ring 32 is carried on the inner edge of cylindrical seat 26 and seals the outer surface of shaft 16. The shaft has an eccentric portion 34 in the stretch between bearings 22 and 24.

A pair of driven shafts 36, 38, parallel to driving shaft 16, are journaled within housing 12, in front of driving shaft 16, and have respective terminations 36a, 38a projecting outside cover 14 and carrying respective L-shaped, integral jaws 40, 42, which cooperate with each other to act as pincers.

Each of the driven shafts 36, 38 is journaled in a pair of bearings 44, 46 and 48, 50, respectively, of which one bearing 44, 48 is housed in a socket in housing 12, while the other bearing 46, 50 is housed in a respective cylindrical opening in cover 14. Sealing rings 56, 58 are received in the openings and seal the external surface of the respective driven shaft 36, 38.

Both driven shafts 36, 38 carry respective, mutually engaging gear sections 36b, 38b. Driven shaft 36 has an arm 60 radially extending beneath its own gear section 36b and arranged for camming cooperation with the eccentric portion 34 of driving shaft 16, as well as an elongated projection 62, radially extending on the opposite side. An elastic member, shown as a helical spring 64 on FIG. 5, is compressed between projection 62 and the internal wall of housing 12, so that it will contrast the rotation of driven shaft 36, caused by the rotation of driving shaft 16 due to the camming cooperation between the eccentric portion 34 and radial arm 60.

A pillar 66 rising from housing 12 supports a peg 68 parallel to driving shaft 16 and axially insertable into a corresponding fixed socket 70 that is integral with the machine's operating head 21. Peg 68 and socket 70 comprise respective complementary frustoconical portions 68a, 70a, designed to help self-centering of peg 68 during insertion.

The operation of gripping device 10 when mounted on a conventional tool machine is described below.

When at rest, gripping device 10 is received in the tool magazine together with the machining tools. When a workpiece is to be loaded, operating head 21 of the machine picks up the gripping device from the tool magazine, the shank 18 of the gripping device being automatically axially inserted into chuck 20, similarly to what would happen with a machining tool. At the same time, peg 68 becomes axially inserted into fixed socket 70. The operating head 21 is then moved to a position above the workpiece to be loaded and the jaws 40, 42 are opened, by rotating the chuck (clockwise in FIGS. 5, 6) against the elastic force of spring 64, due to a camming cooperation between eccentric portion 34 and radial arm 60, as well as to the meshing engagement between gear sections 36b, 38b of driven shafts 36, 38.

A relative rotation between gripping device 10 and operating head 21 during rotation of the chuck is prevented by the engagement of peg 68 in socket 70. Subsequently, operating head 21 moves jaws 40, 42 to a position around the waiting workpiece, and the chuck is then rotated back to its initial condition, so that the jaws are drawn back to their closed configuration, thereby gripping the workpiece. Operating head 21 now moves the workpiece to the worktable and releases it by causing the pincers to open following the same steps as above described. The operating head then returns the gripping device to the tool magazine and picks up the machining tool. At the end of the machining, the operating head returns the tool to the tool magazine and again picks ip the gripping device, in order to remove from the worktable the newly machined workpiece and pick up a fresh one.

As a person skilled in the art will appreciate, by mechanically operating the pincers as proposed by the invention several advantages are obtained. In particular, it is not necessary to implement an external operating system, because the rotation of the chuck is exploited directly, thereby reducing costs and substantially avoiding any operating delays, due to the mechanical connection from the chuck to the driven shafts carrying the jaws. Having now reference to FIGS. 7 to 10, a gripping device 110 according to an alternative embodiment of the invention comprises an elongated box-like housing 112 that is closed by a cover 114 at its bottom.

A driving shaft 116 is journaled within housing 112 and is terminated, outside housing 112, in a shank 118 that is axially engageable in a motorized chuck 20 carried on operating head 21 of the tool machine. Driving shaft 116 is journaled on rolling bearings 122, 124 which are respectively housed in a cylindrical socket 126 of housing 112 and in a bore 128 in cover 114, the bore being sealed by a sealing cap 130. A sealing ring 132 is carried on the inner edge of cylindrical seat 126 and seals the outer surface of shaft 116. The shaft has an eccentric portion 134 in the portion between bearings 122 and 124.

Two pairs of driven shafts 136, 138 and 136', 138', aligned with each other and parallel to driving shaft 116, are journaled within housing 112, in mirror positions with respect to crossplane A (FIG. 9) through the axis of driving shaft 116. The driven shafts have respective terminations 136a, 138a and 136'a, 138'a, projecting outside cover 114 and carrying respective L-shaped, integral jaws 140, 142 and 140', 142', which cooperate with each other in pairs to act as a pair of pincers.

Each of the driven shafts 136, 138 and 136', 138' is journaled in a pair of bearings such as 144, 146 and 148, 150, respectively, of which one is housed in a socket in housing 112, while the other is housed in a respective cylindrical opening in cover 114. Sealing rings such as 156, 158 are received in the openings and seal the external surface of the respective driven shaft.

The driven shafts in each pair are mutually coupled by respective, gear sections 136b, 138b and 136'b, 138'b, integral therewith. Driven shafts 136 and 136' nearer to driving shaft 116 have respective arms 160, 160', arranged for camming cooperation with respective adjacent spans of eccentric portion 134 of driving shaft 116, with interposed anti-friction bearings 135 and 135'.

Driven shafts 138 and 138' farther from driving shaft 116 have respective elongated projections 162, 162', radially extending from the opposite side of driving shaft 116. Elastic members 164 and 164', shown as helical springs on FIG. 9, are compressed between elongated projections 162, 162' and the internal wall of housing 112, so that they will contrast the rotation of driven shafts 136, 136', caused by the rotation of driving shaft 116, due to the camming cooperation between the eccentric portion 134 and radial arms 160, 160'.

A pillar 166 rising from housing 112 supports a peg 168 parallel to driving shaft 116 and axially insertable into a corresponding fixed socket 70 which is integral with operating head 21 of the machine. Peg 168 and socket 70 comprise respective complementary frustoconical portions 168a, 70a, designed to help self-centering of peg 168 during insertion.

The operation of gripping device 110 according to the above described alternative embodiment is similar to the operation of the first embodiment, except that the device of the second embodiment can pick up two side-by-side workpieces at the same time.

More particularly, after the operating head 21 has moved to a position above the desired workpieces, a rotation of the chuck (clockwise in FIG. 10) against the elastic force of springs 164 will cause the jaws 140, 142 and 140', 142' to open due to camming cooperation between eccentric portion 134 and arms 160 and 160', and to meshing engagement between gear sections 136b, 138b and 136'b, 138'b of driven shafts 136, 138 and 136', 138'.

A few preferred embodiments of the invention have been described, but a person skilled in the art will be able to make changes to them within the same inventive concept. In particular, other kinds of mechanical operation of the pincers may be provided, by using different camming members or by using linkages which can take different configurations, provided they are driven by the rotation of the chuck. Gear transmissions may also be used, e.g. by providing the driving shaft with a toothed wheel meshing with transverse racks or with respective driven wheels operatively connected with the jaws of the pincers. Further, other kinds of interconnecting members may be provided between the the jaws of the pincers instead of gear sections, such as leverages or linkages of different types. Moreover, such alternative systems may effect either a rotating opening movement of the jaws, as in the above described examples, or a linear movement. Further, the reaction member contrasting the rotation of the device with respect to the operating head, which in the example disclosed consists of a peg axially insertable into a fixed socket in the operating head, might be differently designed, provided that it is capable of engaging with the operating head when the device shank is engaged by the chuck. It should also be understood that it also falls within the scope of the invention that only one jaw of the pincer is movable, the other being fixed.

The disclosures in European Patent Application No. 05425503.9 from which this application claims priority are incorporated herein by reference.

What is claimed is:

1. A workpiece-gripping device for tool machines having a motorized chuck mounted on an operating head, comprising:
   a housing,
   a driving shaft journaled in the housing in an axially locked position and so as to be rotatable about an axis thereof, said driving shaft being provided with a shank engageable in the chuck;
   a locking member configured to engage a reaction member integral with the operating head when the shank engages the chuck, whereby the rotation of the device is prevented when the chuck is driven;
   at least a pincer having jaws, of which at least one is movable and operatively connected via transmission means to said driving shaft for opening and closing;
   elastic means arranged so as to cooperate with said at least one movable jaw to contrast rotation of said chuck and driving shaft for jaw opening via said transmission means, said at least one jaw being movable in oven position through rotation thereof about a jaw axis that is parallel with the axis of said driving shaft;
   an eccentric portion integral with the driving shaft and in camming cooperation with said movable jaw for rotation thereof about said jaw axis in contrast to said elastic means.

2. The device of claim 1, wherein said movable jaw is mounted on a driven shaft journaled in the housing and is configured for opening and closing under control of the rotation of the driven shaft.

3. The device of claim 2, wherein said driven shaft has an arm in camming cooperation with said eccentric portion of the driving shaft.

4. The device of claim 3, wherein it comprises two of said pincers and wherein the arm of each pincer is configured to be engaged by a different span of said eccentric portion.

5. The device of claim 1, wherein said pincer has a pair of movable jaws, which are operatively interconnected by interconnecting members for opening and closing.

6. The device of claim 5, wherein each of said movable jaws is mounted on a respective driven shaft journaled in the housing and wherein said interconnecting members comprise mutually meshing gear sections, each of which is integral with a respective driven shaft.

7. The device of claim 1, wherein it comprises two of said pincers.

8. The device of claim 1, wherein said reaction member comprises a socket in the operating head, extending parallelly to the chuck axis and said locking member comprises a peg parallel to the driving shaft and axially insertable in said socket when the shank engages the chuck.

9. A workpiece gripping device for tool machines having a motorized chuck mounted on an operating head, comprising:
   a housing;
   a driving shaft journaled in the housing and provided with a shank engageable in the chuck;
   a locking member configured to engage a reaction member integral with the operating head when the shank engages the chuck whereby the rotation of the device is prevented when the chuck is driven;
   jaws forming pincers, the jaws being movable and operatively connected via transmission means to said driving shaft for opening and closing;
   an eccentric portion integral with the driving shaft;
   driven shafts journaled in the housing and having each a said movable jaw mounted thereon;
   arms provided on the driven shafts, the arms being in camming cooperation with said eccentric portion of the driving shaft, said. movable jaws being configured so as to open and close under rotation control of the driven shaft on which are mounted; and
   elastic means arranged to contrast rotation of the driven shafts; wherein two said pincers are provided and wherein the arm of each driven shaft is configured to be engaged by a different span of said eccentric portion.

* * * * *